(12) United States Patent
Thoss et al.

(10) Patent No.: US 9,371,773 B2
(45) Date of Patent: Jun. 21, 2016

(54) TWO-STAGE SUPERCHARGING DEVICE

(71) Applicant: MTU Friedrichshafen GmbH, Friedrichshafen (DE)

(72) Inventors: Andreas Thoss, Markdorf (DE); Thomas Zink, Immenstaad (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 14/348,117

(22) PCT Filed: Sep. 21, 2012

(86) PCT No.: PCT/EP2012/003964
§ 371 (c)(1),
(2) Date: Mar. 28, 2014

(87) PCT Pub. No.: WO2013/045063
PCT Pub. Date: Apr. 4, 2013

(65) Prior Publication Data
US 2014/0245736 A1    Sep. 4, 2014

(30) Foreign Application Priority Data
Sep. 29, 2011  (DE) .......................... 10 2011 115 296

(51) Int. Cl.
*F02B 37/013*  (2006.01)
*F02B 37/18*   (2006.01)
*F02B 37/00*   (2006.01)
*F02C 6/12*    (2006.01)

(52) U.S. Cl.
CPC ............ *F02B 37/013* (2013.01); *F02B 37/004* (2013.01); *F02B 37/18* (2013.01); *F02C 6/12* (2013.01); *F05D 2230/53* (2013.01); *Y02T 10/144* (2013.01)

(58) Field of Classification Search
CPC ...... F02B 37/013; F02B 37/025; F02B 37/18; F02B 37/183; Y02T 10/144
USPC ......................................... 60/322, 602, 605.1
See application file for complete search history.

(56) References Cited

U.S. PATENT DOCUMENTS 4,463,564 A    8/1984   McInerney
5,119,633 A    6/1992   Brooks et al.
(Continued)

FOREIGN PATENT DOCUMENTS

DE    3803010 A     8/1989
DE    19549020 A    7/1996
(Continued)

*Primary Examiner* — Audrey K Bradley
(74) *Attorney, Agent, or Firm* — Lucas & Mercanti, LLP; Klaus P. Stoffel

(57) ABSTRACT

A two-stage supercharger for an engine having a radial high-pressure turbine and an axial low-pressure turbine. The high-pressure turbine has a spiral housing with an exhaust-gas inlet connected to an exhaust line and via which exhaust-gas flows from the engine to the high-pressure turbine. A partial flow of the exhaust-gas flows past the high-pressure turbine in a bypass unit and is adjustable by a shut-off valve. The bypass unit includes a branch line and an annular duct housing integral with the spiral housing. The branch line branches off the exhaust-gas inlet at a point where the shut-off valve is arranged and issues into a duct of the annular duct housing. The partial flow flows through the branch line into the duct and an axially arranged annular gap into an exhaust-gas duct. The partial flow merges with a main exhaust-gas flow from the high-pressure turbine and flows into the low-pressure turbine.

10 Claims, 4 Drawing Sheets

(56) References Cited

U.S. PATENT DOCUMENTS

| | | |
|---|---|---|
| 5,584,181 A | 12/1996 | Jinnouchi |
| 8,037,683 B2 | 10/2011 | Wirbeleit et al. |
| 2009/0217662 A1* | 9/2009 | Giselmo et al. ............... 60/602 |
| 2010/0126169 A1* | 5/2010 | Hegner ........................... 60/602 |
| 2012/0312012 A1 | 12/2012 | Thoss et al. |

FOREIGN PATENT DOCUMENTS

| | | |
|---|---|---|
| DE | 19837978 | 11/1999 |
| DE | 102004058371 | 6/2006 |
| DE | 102005025885 | 12/2006 |
| DE | 102006001571 A | 8/2007 |
| DE | 102007017843 | 11/2008 |
| DE | 102007046667 A | 4/2009 |
| DE | 102009046940 Y | 5/2011 |
| EP | 0078637 | 5/1983 |
| EP | 0477579 | 4/1992 |
| EP | 1666704 | 6/2006 |
| EP | 1710415 A | 10/2006 |
| JP | 54019007 Y | 3/1979 |
| WO | 9319982 A | 10/1993 |
| WO | 2004101971 | 11/2004 |
| WO | 2008125555 | 10/2008 |

* cited by examiner

TWO-STAGE SUPERCHARGING DEVICE

The present application is a 371 of International application. PCT/EP2012/003964, filed Sep. 21, 2012, which claims priority of DE 10 2011 115 296.6, filed Sep. 29, 2011, the priority of these applications is hereby claimed and these applications are incorporated herein by reference.

BACKGROUND OF THE INVENTION

The present invention pertains to a two-stage supercharging device with a high-pressure turbine and low-pressure turbine for internal combustion engines.

A modern internal combustion engine is usually equipped with a two-stage supercharging device. A first stage of the supercharging device is a high-pressure stage, the second stage a low-pressure stage. The high-pressure stage comprises a high-pressure turbine and a high-pressure compressor. The low-pressure stage comprises a low-pressure turbine and a low-pressure compressor. The high-pressure stage and the low-pressure stage of the supercharging device are each provided with a rotor assembly, which, in the one case, comprises a high-pressure turbine wheel, a shaft, and a high-pressure compressor wheel and, in the other case, a low-pressure turbine wheel, a shaft, and a low-pressure compressor wheel. During operation, an exhaust gas stream flows from the internal combustion engine through an exhaust gas line into the high-pressure turbine and then through an exhaust gas channel into the low-pressure turbine. In the upper load ranges of the internal combustion engine, the exhaust gas stream is so strong that the rotor assembly of the high-pressure stage can rotate so fast that it would be damaged by the centrifugal forces which develop. To prevent this, the main exhaust gas stream is divided at a branching point in the exhaust gas line into a primary exhaust gas stream and a secondary exhaust gas stream. The primary exhaust gas stream flows into the high-pressure turbine, whereas the secondary exhaust gas stream flows through a bypass device which takes it around the high-pressure turbine. In the simplest case, the bypass device comprises a branch line branching off from the exhaust gas line at the branching point and a shutoff valve arranged in this branch line. In the upper load range, therefore, the secondary exhaust gas stream is branched off from the main exhaust gas stream into the branch line upstream of the high-pressure turbine, is regulated by the shutoff valve, and is conducted into the exhaust gas channel downstream of the high-pressure turbine. As a result, the primary exhaust gas stream flowing into the high-pressure turbine is reduced, and the rotor assembly of the high-pressure stage is therefore protected from damage. The secondary exhaust gas stream flowing through the bypass device around the high-pressure turbine rejoins the primary exhaust gas stream flowing out of the high-pressure turbine in the exhaust gas channel and then flows into the low-pressure turbine. The bypass device together with its structural attachment to the exhaust gas channel is the primary focus of the invention and is described below in greater detail.

Examples of various designs for this structural attachment are known from the prior art. The publication DE 10 2007 046 667 A1, for example, shows an attachment in the form of a ring-shaped channel extending around the exhaust gas channel. According to the description, the secondary exhaust gas stream flows into this ring-shaped channel, becomes uniformly distributed in it, and then flows radially into the exhaust gas channel. In the description, the basic problems associated with the conditions under which one fluid flows into another are already discussed, but an optimal solution is not yet implemented here. The disadvantage of this publication is that, as the secondary exhaust gas stream is flowing radially inward into the exhaust gas channel, strong vortices develop at the edge of the ring-shaped channel. These are associated with a considerable loss of pressure, and a long exhaust gas channel is necessary to calm the reunited exhaust gas stream to ensure that it flows uniformly into the downstream low-pressure turbine. The pressure loss means a considerable loss of efficiency for the low-pressure turbine. The ring channel arranged downstream from the high-pressure turbine and the long exhaust gas channel lead to the need for a large amount of space to accommodate the components. A loss of efficiency and the need for a large amount of space are unfavorable for an internal combustion engine.

Another prior art is known from EP 1 710 415 A1. The bypass device comprises here the branch line, the shutoff valve, a connecting flange, and the ring-shaped channel. The secondary exhaust gas stream branches off into the branching line upstream from the high-pressure turbine. To regulate the secondary exhaust gas stream, the shutoff valve is installed in the branch line. The secondary exhaust gas stream enters the ring channel through a connecting flange, the channel being arranged in the form of a spiral extending around the exhaust gas channel. The primary and secondary exhaust gas streams are conducted separately up to a point directly upstream of the low-pressure turbine wheel. The disadvantage of this is that the primary and secondary exhaust gas streams cannot recombine upstream of the low-pressure turbine, which leads to radial nonuniformity of the inflow into the low-pressure turbine wheel. In conjunction with the swirling of the secondary exhaust gas stream caused by the spiral shape of the ring-shaped channel, this results in poor efficiency of the low-pressure turbine. An additional disadvantage is the requirement for a large amount of space and a large number of separate components for the layout of the bypass device in the branch line and its shutoff valve; the same applies to the ring channel and its separate connecting flange.

SUMMARY OF THE INVENTION

The goal of the invention is to improve the guidance of the secondary exhaust gas stream as it flows from the ring channel into the exhaust gas channel and to design the bypass device and the ring channel in optimal fashion with respect to the amount of space required and the number of components.

The invention provides a two-stage supercharging device for an internal combustion engine comprising a high-pressure and a low-pressure turbine, wherein the high-pressure turbine is designed as a radial turbine with a spiral housing, the low-pressure turbine as an axial turbine, wherein the spiral housing comprises an exhaust gas inlet connector, which is connected to an exhaust gas line, via which an exhaust gas stream flows from the internal combustion engine to the high-pressure turbine, wherein the high-pressure turbine and the low-pressure turbine are arranged opposite each other on an axis, and an exhaust gas outlet of the high-pressure turbine is connected fluidically via an exhaust gas channel to an exhaust gas inlet of the low-pressure turbine, wherein a secondary exhaust gas stream of the main exhaust gas stream can be conducted through a bypass device around the high-pressure turbine, wherein the bypass device comprises a branch line and a ring channel housing, wherein the ring channel housing forms a ring channel, and the branch line opens out into the ring channel, wherein the secondary exhaust gas stream branches off from exhaust gas stream upstream of a high-pressure turbine wheel of the high-pressure turbine, and the ring channel is arranged around the exhaust gas channel downstream of the high-pressure turbine and is connected fluidically to this channel, so that a primary exhaust gas stream leaving the high-pressure turbine combines in the exhaust gas channel with the secondary exhaust gas stream of the bypass device, the combined stream then flowing onward into the low-pressure turbine, wherein a shutoff valve is arranged in the bypass device. The spiral housing of the high-pressure turbine and the ring channel housing are designed as a single, integral unit.

The advantages include the low cost of producing only a single component and thus also the low cost of assembly without a large number of complicated assembly steps. In addition, production of the components as a one-piece casting, for example, makes it easier to achieve a compact, space-saving design, which means that it is possible to configure the course of the spiral channel formed by the spiral housing and the course of the ring channel in such a way that the largest cross sections of the spiral and ring channels are both on the same side. This channel configuration is novel in terms of casting technology, offers transitions which are optimal in terms of fluid engineering, and thus provides flow guidance for the secondary exhaust gas stream much superior to that which has been conventional up to now. As a result of a design based on casting technology, the guidance of the secondary exhaust gas steam from the ring channel into the exhaust gas channel is also improved.

According to a preferred embodiment of the invention, the spiral housing and the ring channel housing are connected at their facing surfaces by a common wall area.

According to another preferred embodiment of the invention, the spiral housing of the high-pressure turbine and the branch line are designed as a single integral part.

According to another preferred embodiment of the invention, the branch line branches off from the exhaust gas inlet connector of the spiral housing, and the branch line and the spiral housing are designed as a single integral part.

The advantage of the one-piece housing design is that the previously described components of which it consists are combined into a housing, which can be produced as, for example, a compact casting. As a result, the number of components is reduced, and thus the amount of complicated machining required during fabrication is also reduced. The housing can be shorter and more compact and therefore takes up less space in the internal combustion engine.

According to another preferred embodiment of the invention, the ring channel has its largest cross sections in an orifice area of the branch line and, proceeding from the orifice area, the cross section decreases in both circumferential directions of the ring channel until a point on ring channel which lies opposite the orifice area of the branch line.

The advantage here is that the secondary exhaust gas steam entering the ring channel is uniformly distributed around the ring channel and therefore flows out uniformly and swirl-free into the exhaust gas channel, where it recombines with the primary exhaust gas stream. As a result, the exhaust gas acts uniformly on the low-pressure turbine, which increases its efficiency.

According to another preferred embodiment of the invention, the shutoff valve is arranged in the branch line.

The advantage of this is that a compact arrangement of the components and a decrease in the number of components are thus achieved. In addition, the arrangement of the shutoff valve close to the high-pressure turbine or in the bypass device makes it possible for the high-pressure turbine to respond rapidly, without lag time, to adjustments of the shutoff valve.

According to another preferred embodiment of the invention, the shutoff valve is designed with a flap, and the flap is arranged in a wall of the exhaust gas inlet connector in the area of the branching point of the branch line and forms, when in the closed state, a wall for the gas stream which conforms more-or-less to the wall contour of the exhaust gas inlet connector.

The advantage of this is that, when the flap is closed, the exhaust gas stream can flow into the high-pressure turbine along a contour almost completely free of flow-disrupting elements, which is necessary for a high degree of turbine efficiency.

According to another preferred embodiment of the invention, a flow guide surface for the primary exhaust gas stream leaving the high-pressure turbine is integrated into the component forming the ring channel and the spiral housing.

The advantage of this is that the functions of the housing and of the flow guide surface are thus combined into a single component, and a compact and space-saving arrangement is achieved.

According to another preferred embodiment of the invention, the ring channel is designed with an annular gap open toward the low-pressure turbine, and the ring channel is connected fluidically to the exhaust gas channel by this annular gap.

The advantage of this is that the secondary exhaust gas stream flows uniformly through the annular gap and toward the low-pressure turbine without any loss of pressure, which thus increases the efficiency of that turbine.

According to another preferred embodiment of the invention, the outside diameter of the annular gap and the nominal diameter of the exhaust gas channel are equal in size to the outside diameter of the low-pressure turbine wheel of the low-pressure turbine.

The advantage here is that the secondary exhaust gas stream leaving the annular gap flows to the low-pressure turbine and recombines with the primary exhaust gas stream without passing through any points where pressure could be lost. Thus the low-pressure turbine is subjected to a relatively high pressure, which leads to high efficiency.

According to another preferred embodiment of the invention, a radially outer wall of the ring channel housing is extended to form a connecting flange for a compensator, which is connected to the axial turbine.

The advantage of this is that the connecting flange can be cast onto the ring channel housing, for example. As a result, the connection of a compensator or of some other component can be accomplished directly without the need for any additional connecting parts.

An exemplary embodiment of the invention is illustrated in the drawing and is described in greater detail below.

DETAILED DESCRIPTION OF THE INVENTION

Figure 1:
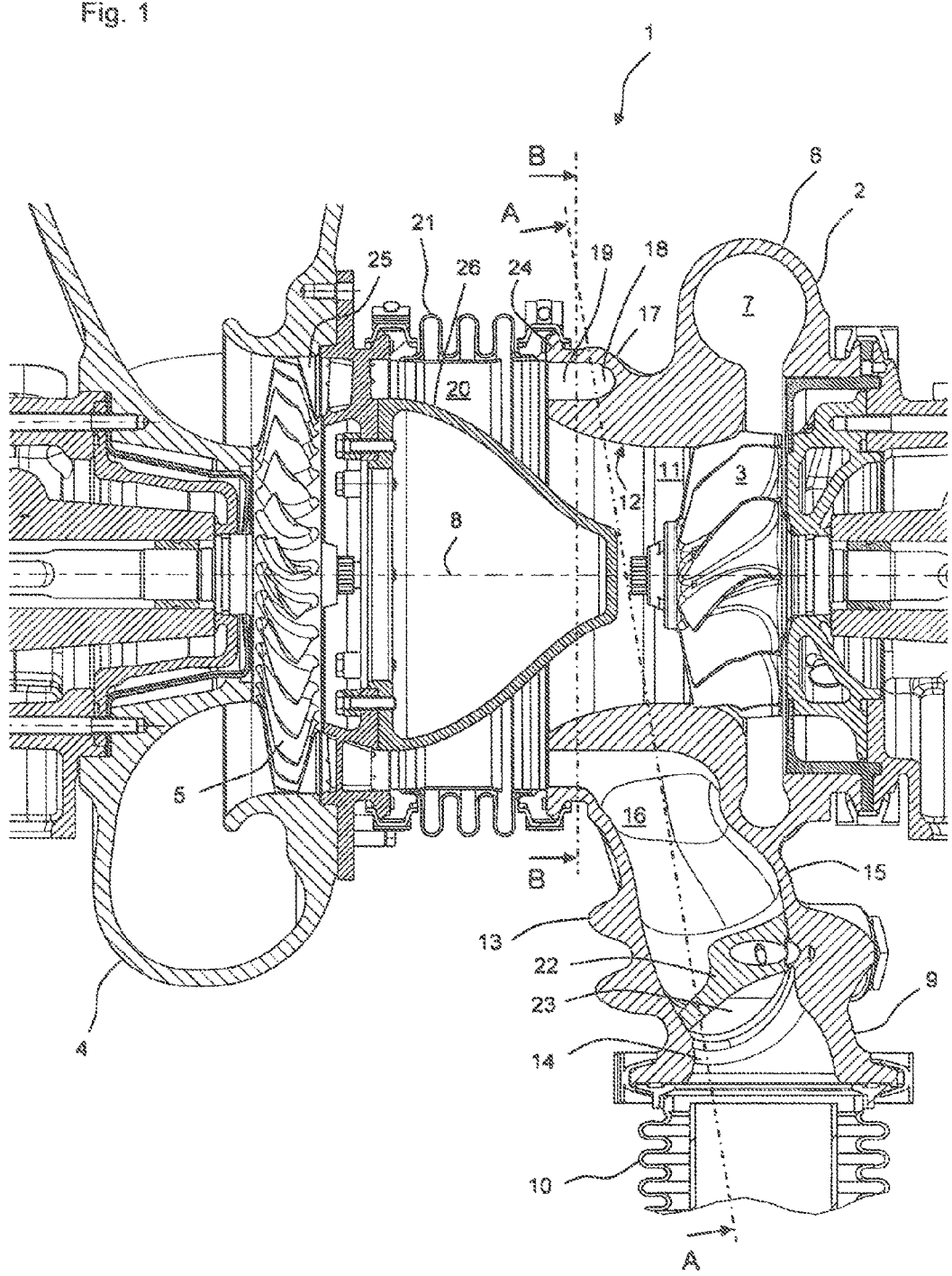
FIG. 1 shows part of a longitudinal cross section through a two-stage supercharging device with a high-pressure turbine and a low-pressure turbine.

FIG. 1 shows part of a longitudinal cross section through a two-stage supercharging device 1 with a high-pressure 2 turbine and a low-pressure turbine 4. The high-pressure turbine 2 is designed here as a radial turbine with a spiral channel 7 formed by a spiral housing 6; the low-pressure turbine 4 is designed as an axial turbine. The two turbines are mounted opposite each other on an axis 8. Partially visible is a bypass device 13 formed on the spiral housing 6; this device comprises a branch line 15 and a ring channel housing 17. In addition, an exhaust gas inlet connector 9 is formed on the spiral housing 6; the branch line 15 branches off from this connector at a branching point 14. An exhaust gas line 10 is connected to the exhaust gas inlet connector 9. In a lower-to-middle load range of an internal combustion engine (not shown), exhaust gas flows from the engine via the exhaust gas line 10, the exhaust gas inlet connector 9, and the spiral channel 7 to a high-pressure turbine wheel 3. In the lower-to-middle load range, this main exhaust gas stream simultaneously represents the primary exhaust gas stream, which drives the high-pressure turbine wheel 3 and leaves the high-pressure turbine 2 via an exhaust gas outlet 11 along flow guide surfaces 12. The primary exhaust gas stream then flows via an exhaust gas channel 20 and along a guide body 26 mounted in the exhaust gas channel 20 before reaching an exhaust gas inlet 25 to the low-pressure turbine 4, so that it can drive the low-pressure turbine wheel 5 there. In the upper load ranges of the internal combustion engine, the main exhaust gas stream is in some cases so strong that the high-pressure turbine wheel 3 can spin too fast and thus suffer damage. To prevent this, the main exhaust gas stream is split at the branching point 14 into a primary exhaust gas stream and a secondary exhaust gas stream. The primary exhaust gas stream flows into the high-pressure turbine 2, whereas the secondary exhaust gas stream flows through the bypass device 13 and thus around the high-pressure turbine 2. To regulate the secondary exhaust gas stream, a shutoff valve 22 is installed in the branching point 14, i.e., the point where the branch line 15 leads away from the exhaust gas inlet connector 9. This shutoff valve 22 is designed as a flap 23, which is shown incompletely and in perspective here. In the upper load range, the flap 23 is opened by a drive (not shown). As a result, the secondary gas stream flows via the branch line 15 to an orifice area 16, through which it passes into a ring channel 18, which is formed by the ring channel housing 17. The ring channel housing 17 is formed on the spiral housing 6. The secondary exhaust gas stream distributes itself throughout the ring channel 18 and then flows uniformly via an annular gap 19 in the ring channel 18 into the exhaust gas channel 20. The secondary gas stream recombines with the primary exhaust gas stream in the gas channel 20, and the two combined streams then flow together along the guide body 26 to the exhaust gas inlet 25 of the low-pressure turbine 4. The radially outer wall of the ring channel housing 17 is extended to form a connecting flange 24, to which a compensator 21 is connected, which forms the exhaust gas channel 20. A compensator 21 is usually used in the case of a two-stage supercharging device 1 such as that shown here to connect the high-pressure turbine 2 to the low-pressure turbine 4.

Figure 2:
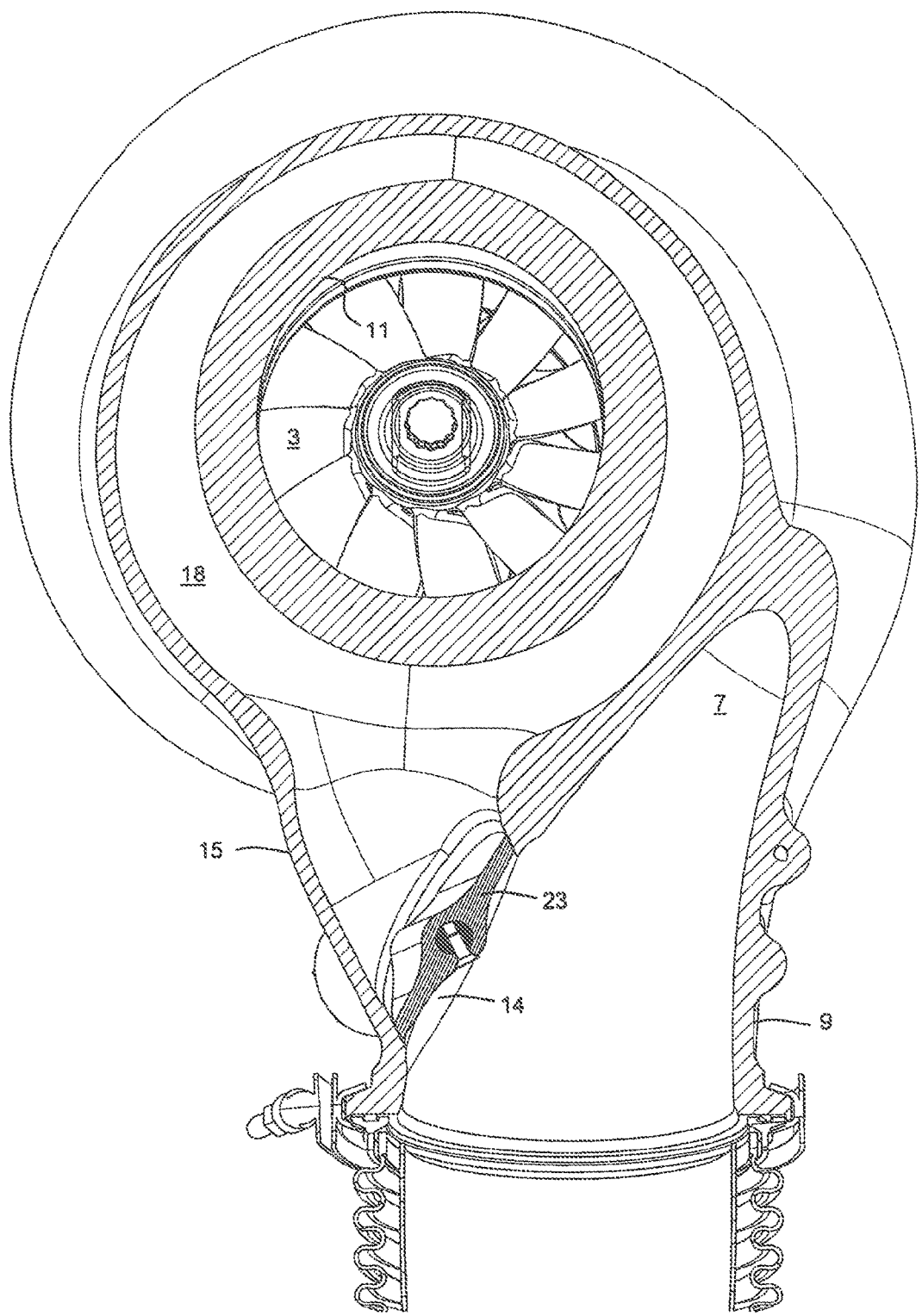
FIG. 2 shows a cross section along the line A-A through the exhaust gas outlet, the ring channel, part of the spiral channel, the exhaust gas inlet connector, the branch line, and the flap arranged in the branching point.

FIG. 2 shows a cross section along the line A-A through the exhaust gas outlet 11, the ring channel 18, the beginning part of the spiral channel 7, the exhaust gas inlet connector 9, the branch line 15, and the flap 23 mounted at the branching point 14. In this position, the flap 23 closes off the branch line 15. Thus the flap 23 forms an approximation of a wall for the exhaust gas stream, which follows the contour of the walls of the exhaust gas inlet connector 9 as it flows into the spiral channel 7. The entire exhaust gas stream coming from the internal combustion engine (not shown) becomes the primary exhaust gas stream, which flows into the spiral channel 7, through the high-pressure turbine wheel 3, through the exhaust gas outlet 11, and into the exhaust gas channel 20 (not shown in this diagram).

Figure 3:
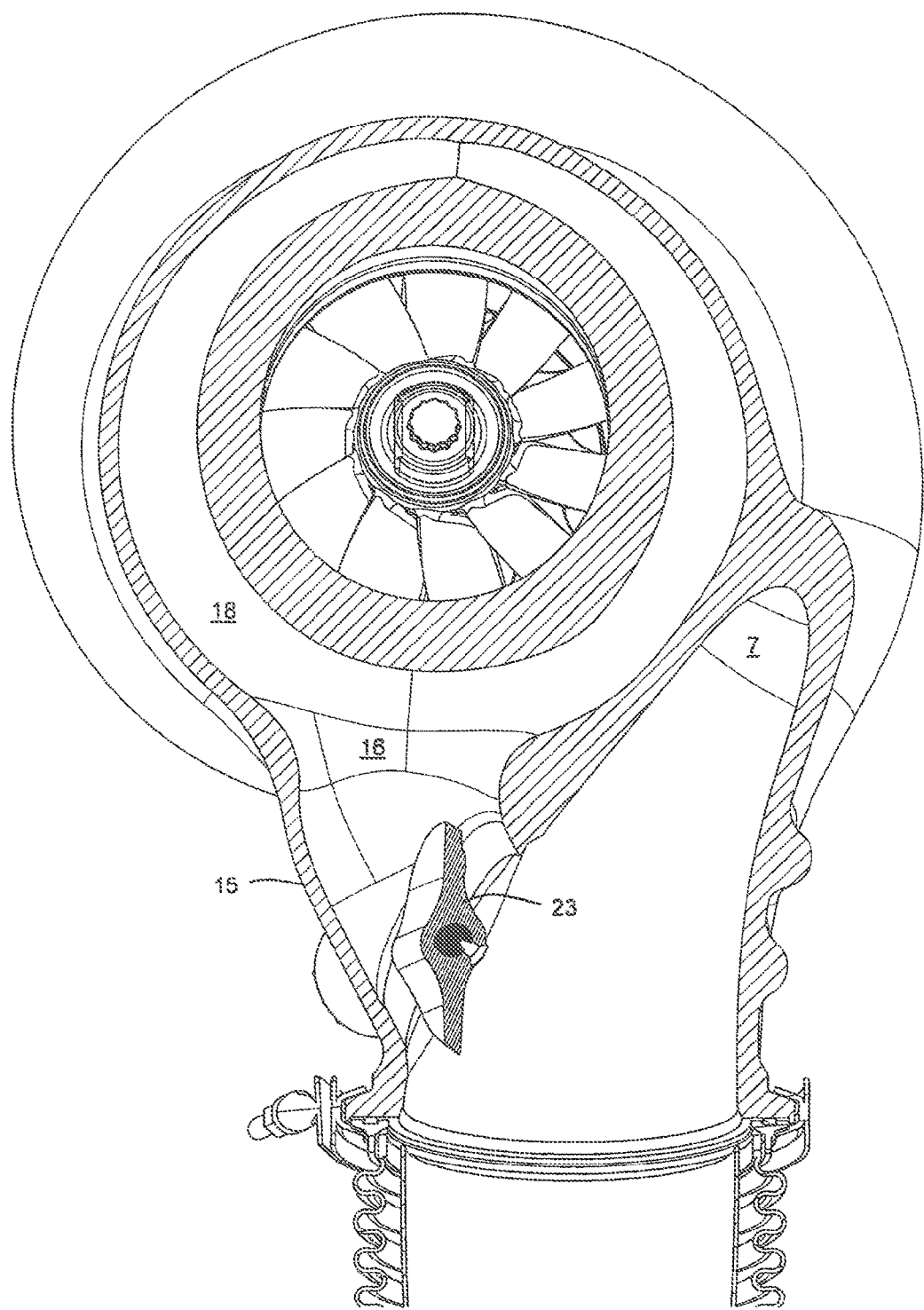
FIG. 3 shows a cross section along the line A-A as in FIG. 2 but with the flap in the open position.

FIG. 3 shows a cross section along the line A-A as in FIG. 2, but here the flap 23 is in the open position. As a result, the main exhaust gas stream is split into a primary exhaust gas stream and a secondary exhaust gas stream. The primary exhaust gas stream flows into the spiral channel 7. The secondary exhaust gas stream flows via the branch line 15 to the orifice area 16 and thus into the ring channel 18. In the ring channel 18, the secondary exhaust gas stream is uniformly distributed in both circumferential directions and flows via the annular gap 19 (not shown, see FIG. 4) into the exhaust gas channel 20 (not shown in this diagram).

Figure 4:
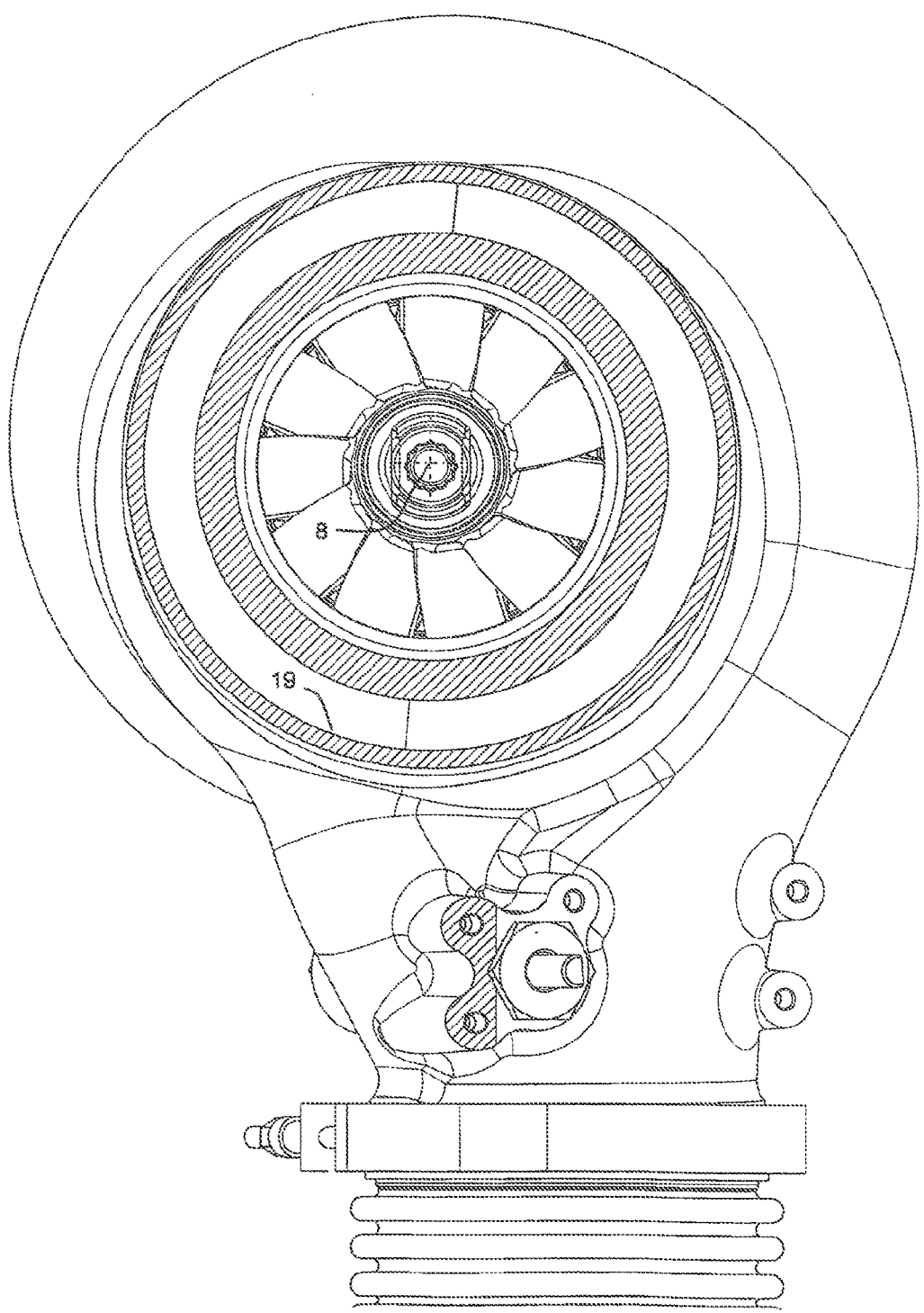
FIG. 4 shows a cross section along the line B-B through the annular gap.

FIG. 4 shows a cross section along the line B-B in FIG. 1 through the annular gap 19. In this view, the guide body 26 has been omitted. The annular gap 19 has a constant width and is concentric to the axis 8. Through the annular gap 19, the secondary exhaust gas stream flows axially into the exhaust gas channel 20 (not shown in this diagram).

LIST OF REFERENCE NUMBERS

1 two-stage supercharging device
2 high-pressure turbine
3 high-pressure turbine wheel
4 low-pressure turbine
5 low-pressure turbine wheel
6 spiral housing
7 spiral channel
8 axis
9 exhaust gas inlet connector
10 exhaust gas line
11 exhaust gas outlet
12 flow guide surfaces
13 bypass device
14 branching point
15 branch line
16 orifice area
17 ring channel housing
18 ring channel
19 annular gap
20 exhaust gas channel
21 compensator
22 shutoff valve
23 flap
24 connecting flange
25 exhaust gas inlet
26 guide body

The invention claimed is:

1. A two-stage supercharging device for an internal combustion engine, comprising:
    a radial high-pressure turbine with a spiral housing and a high-pressure turbine wheel;
    an axial low-pressure turbine having a low-pressure turbine wheel,
    wherein the spiral housing comprises an exhaust gas inlet connector, which is connected to an exhaust gas line, via which a primary exhaust gas stream flows from the internal combustion engine to the high-pressure turbine,
    wherein the high-pressure turbine and the low-pressure turbine are mounted opposite each other on an axis, and an exhaust gas outlet of the high-pressure turbine is connected fluidically via an exhaust gas channel to an exhaust gas inlet of the low-pressure turbine;
    a bypass device that conducts a secondary exhaust gas stream split off from the primary exhaust gas stream around the high-pressure turbine, the bypass device includes a branch line and a ring channel housing, wherein the ring channel housing forms a ring channel, and the branch line opens out into the ring channel, wherein the secondary exhaust gas stream branches off from the primary exhaust gas stream upstream of the high-pressure turbine wheel of the high-pressure turbine, and the ring channel is arranged around the exhaust gas channel downstream from the high-pressure turbine and is connected fluidically to the exhaust gas channel so that the primary exhaust gas stream leaving the high-pressure turbine recombines in the exhaust gas channel with the secondary exhaust gas stream from the bypass device, so that the combined stream flows into the low-pressure turbine; and a shut off valve is installed in the bypass device, wherein the spiral housing of the high-pressure turbine and the ring channel housing are formed as only a single piece wherein a radially outer wall of the ring channel housing is extended to form a connecting flange for a compensator, which is connected to the axial turbine.

2. The supercharging device according to claim 1, wherein the spiral housing and the ring channel housing are connected to each other at facing surfaces by a common wall area.

3. The supercharging device according to claim 1, wherein the ring channel defines two circumferential directions, has a largest cross section in an orifice area of the branch line, and, proceeding from the orifice area, the cross section decreases in both circumferential directions of the ring channel to a point on the ring channel located opposite the orifice area of the branch line.

4. The supercharging device according to claim 1, further comprising a flow guide surface for the primary exhaust gas stream leaving the high-pressure turbine integrated into a component forming the ring channel and the spiral housing.

5. The supercharging device according to claim 1, wherein the ring channel has an annular gap open toward the low-pressure turbine, and the ring channel is connected fluidically to the exhaust gas channel via the annular gap.

6. The supercharging device according to claim 5, wherein an outside diameter of the annular gap and an inside diameter of the exhaust gas channel are equal in size to an outside diameter of the low-pressure turbine wheel of the low-pressure turbine.

7. The supercharging device according to claim 1, wherein the spiral housing of the high-pressure turbine is an integral part of the branch line.

8. The supercharging device according to claim 7, wherein the branch line branches off from the exhaust gas inlet connector of the spiral housing and is an integral part of the spiral housing.

9. The supercharging device according to claim 8, wherein the shutoff valve is installed in the branch line.

10. The supercharging device according to claim 9, wherein the shutoff valve has a flap located in a wall of the exhaust gas inlet connector in an area of a branching point of the branch line and, in a closed state the flap forms a wall for the exhaust gas stream conforming to a contour of the wall of the exhaust gas inlet connector.

* * * * *